April 1, 1969 R. F. STOLL ET AL 3,436,103
TRANSITION FITTING FOR CORRUGATED PIPE
Filed June 23, 1967

INVENTORS
ROBERT F. STOLL
ALBION K. SNELLINGS
BY Emory L. Groff Jr
ATTORNEY

United States Patent Office 3,436,103
Patented Apr. 1, 1969

3,436,103
TRANSITION FITTING FOR CORRUGATED PIPE
Robert F. Stoll, Girard, and Albion K. Snellings, Canfield, Ohio, assignors to Republic Steel Corporation, Cleveland, Ohio, a corporation of New Jersey
Filed June 23, 1967, Ser. No. 648,410
Int. Cl. F16l *15/00, 25/00*
U.S. Cl. 285—177                          3 Claims

ABSTRACT OF THE DISCLOSURE

A coupling member for joining the opposed ends of two pipe sections of unequal diameters. The coupling member has a generally frusto-conically shaped body engaging the exterior of the smaller pipe and the interior of the large pipe. At least one end edge of the coupling member is scalloped so as to mate with crests and valleys of one of the pipe sections which is helically corrugated.

---

Many problems have been encountered in the past as attempts have been made to provide structurally sound connections when joining adjacent axial lengths of corrugated pipe sections. The problem is difficult enough when the two adjacent pipe sections are of equal diameter and when the corrugations of the sections extend perpendicular to the longitudinal axes thereof but when two adjacent sections of unequal diameters must be joined together and also when the corrugations are disposed helically then the problem of providing an air and water tight joint having structural continuity at least equal to the full strength of the parent pipe sections has appeared almost insurmountable. A great need for a practical coupling means for the latter described situation exists in the field of concrete piling wherein the shell for the formation of the concrete piling usually comprises helically corrugated pipe sections of a plurality of axially adjacent unequal diameters. The coupling means forming the joint between these adjacent sections must not only be air and water tight to prevent the infiltration of water which would be a cause for rejection of the pile but must also comprise a sound joint of an inherent strength which would preclude structural failure of the shell.

The primary reason for the difficulty in achieving a practical and, at the same time, structurally sound joint between helically corrugated pipe sections of unequal diameters is because of the irregular peripheral surface achieved when a helically corrugated pipe section is square cut. It will be apparent that the resultant peripheral cut edge comprises an undulating curve. In the past, transitions between such helically corrugated pipe sections have been accomplished by means of extensive heating, pounding, and re-forming of the pipe section ends for the purpose of stretching or shrinking the juxtaposed mating portions to a common diameter. Alternate means has comprised coupling members made of intricate castings or the use of complicated and expensive multiple component assemblies for transition fittings or the modifying of the cut ends of the pipe sections in order to remove the corrugations before joining the pipe sections. Such solutions have all had inherent economic or structural weaknesses. The transition sections and methods have either been costly in themselves or have required excessive field or shop labor to accomplish. Where the less costly methods have been employed the structural and water tight integrity of the transition fittings have been sacrificed. By the present invention, a structurally sound and inexpensive solution has been achieved which is capable of developing the full strength of the parent pipe sections without the necessity of any costly components or assemblies and which can be employed either in the shop or in the field by utilizing standard welding procedures which are applied to the unmodified cut ends of the corrugated pipe sections.

Accordingly, one of the objects of the present invention is to provide a transition fitting for corrugated pipe particularly adapted to join the adjacent free ends of two corrugated pipe sections of unequal diameters.

Another object of the present invention is to provide a transition fitting for corrugated pipe comprising a single ring member having opposite edges adapted to engage, in full-contact relationship, with the end portions of pipe sections of unequal diameters.

A further object of the present invention is to provide a transition fitting for corrugated pipe of unequal diameters wherein the corrugations of one or both of the adjacent pipe sections are helically disposed.

Another object of the present invention is to provide a transition fitting for corrugated pipe comprising a conelike ring member having one or both edges scalloped to mate with and form continuous contact with the corrugations of the pipe sections to provide an air and water tight connection.

Still another object of the present invention is to provide a transition fitting particularly adapted to join corrugated pipe sections of unequal diameters and which is applied to the cut end portions of the pipe sections without any modification thereof.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing in which.

Similar reference characters designate corresponding parts throughout the several views of the drawing.

Figure 1:
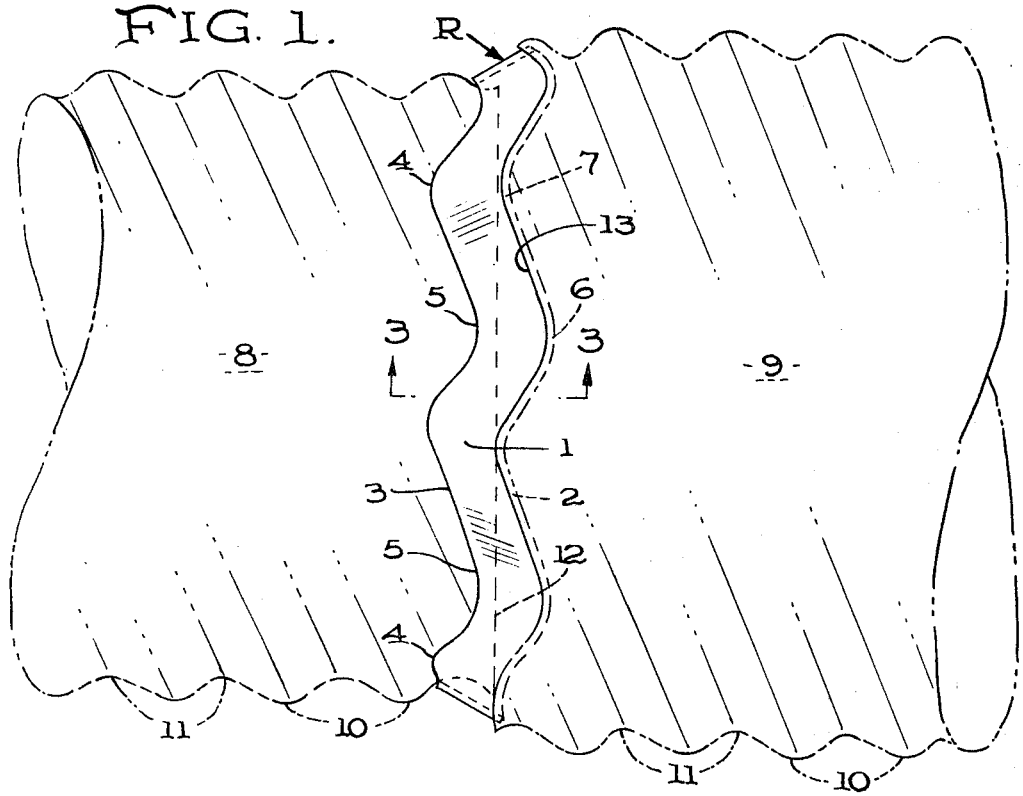
FIGURE 1 is a side elevation of the transition fitting of the present invention and shows in broken lines the joining of two helically corrugated pipe sections of unequal diameters.

Referring now to the drawing, particularly FIGURE 1, it will be seen that the transition fitting of the present invention comprises a single integral ring member generally designated R and includes a wall 1 which for the purposes of understanding this invention may be considered to have been cut from a cone. An important feature of the ring R is that the wall 1 describes a pure circle or in other words is of a constant radius from any single point along the center axis. On the other hand, it will be seen from FIGURE 1 that the edges 2 and 3 are scalloped to provide a sinuous or serpentine cone-shaped ring when viewed in side elevation. The smaller diameter scalloped edge 3 comprises a plurality of equispaced nodes or peaks 4 between which are disposed a plurality of equispaced recesses or indentations 5. The larger diameter scalloped edge 2 is likewise provided with a plurality of equispaced nodes or peaks 6 and intermediate equispaced recesses or indentations 7. The nodes 4 and recesses 5 of the one edge 3 are not necessarily axially aligned with the nodes 6 and recesses 7 of the other scalloped edge 2 for reasons which will become clear hereinafter.

The transition fitting R is shown in FIGURE 1 as a coupling means joining the end of a small corrugated pipe section 8 to the juxtaposed end of a larger pipe section 9. In the view of this figure both of the pipe sections are of the helically corrugated type having a plurality of equispaced crests 10 and lesser diameter valleys 11. Those versed in the art will readily appreciate that when such a pipe section is square cut as shown by the edge 12 at the end of the small pipe section 8 an undulating curve will be produced as the pipe section is viewed from the end. Although the juxtaposed end edge 13 of the large pipe section 9 is shown in FIGURE 1 after it has been modified, it will be understood that this modification, which will be explained hereinafter, has no effect whatsoever upon the application of the transition fitting of the present invention, and while considering the manner of applying the transition fitting R to connect the pipe sections 8 and 9, one may disregard this modified edge 13 of the section 9 for the edge 13 may initially be a straight or square cut edge such as the edge 12 of the small pipe section 8.

The primary feature of the present transition fitting is that the ring R is applied to the helically corrugated pipe section much in the same manner as a threaded nut is applied to a threaded bolt. In other words, the transition fitting serves as a threaded member. In the case of applying the ring R to the exterior of the helices of the small pipe section 8, the lesser diameter scalloped edge 3 of the transition fitting serves as an internally threaded member which is twisted clockwise as it is applied to the end of the pipe section 8. To join the ring R to the larger diameter end of the pipe section 9 the scalloped edge 2 is inserted into the interior of the pipe section 9 and caused to rotate clockwise relative to the section 9 when viewing the end of this pipe section whereby the edge 2 will mate with the juxtaposed interior surfaces of the crests 10 and valleys 11 of this pipe section. Quite obviously this assembly may be achieved in more than one manner. The ring R, on the one hand, can be threaded onto the first pipe section an axial distance greater than its final desired position, whereupon when the second pipe section is placed in position and the other edge of the ring threaded into engagement with the second section it will be seen that the first threaded edge would be partially unthreaded from the first pipe section as the other edge of the ring is threaded onto the second section. Another assembly procedure would be to thread the ring R onto the first pipe section and thereafter attach the second pipe section to the other edge of the ring by rotating this second pipe section while holding the ring itself stationary. It will be apparent that the radial spacing of the nodes and recesses formed in both of the scalloped edges 3 and 2 of the ring R will be selected according to the number of and inclination of the helical corrugations as presented at the end edges 12 and 13 of the two pipe sections in question. Although the wall 1 of the ring R is of a constant radius taken from any one single axial point, it will be seen that in view of the inclination or cone angle of the ring R and the axial extensions offered by the nodes on both of the scalloped edges 2 and 3, that an irregular or undulating curve will be formed by the two scalloped edges when viewed in end elevation from a point along the axial center of the pipe sections and it is this undulating curve which provides for the total constant engagement of the scalloped edges 2 and 3 with the juxtaposed curvature of the two pipe sections as caused by their respective crests 10 and valleys 11.

By the above arrangement a unique advantage will be apparent. The actual total length of the contacting surfaces forming the joint between each end of the transition fitting R and the juxtaposed pipe section is greater than the linear circumference of the pipe section itself, thereby greatly enhancing the structural soundness of the pipe assembly. At this point it may be mentioned that following the assembly of the transition fitting to the two different diameter pipe sections as shown in FIGURE 1, a suitable bonding step may be utilized to add rigidity and permanence to the transition fitting such as welding which may be done either exteriorly or interiorly of the fitting. In view of the above described greater length of contact surface between the transition fitting and juxtaposed pipe sections it will now be apparent that when welding is included in the assembly process that also a greater length of weld line will be present, therefore resulting in a lower weld unit stress.

Referring again to the end edge 13 of the larger diameter pipe section 9, it will be seen that this edge has been cut or trimmed back to the point of engagement between the scalloped edge 2 of the ring R in order to eliminate the shoulder effect of the larger diameter pipe and remove projections which would be vulnerable to rock or soil resistance when the pipe assembly is used as a pile shell and is driven into the earth. Likewise, after the application of the ring R to a small pipe section and prior to the subsequent assembly of a larger pipe section to the ring R, the internally projecting edge 12 of the small pipe section may be similarly trimmed to coincide with the configuration of the contact surface of the small pipe section with the ring so as to provide a neat and relatively smooth inner surface which would reduce the likelihood of interference within the pipe assembly upon the passage of objects or materials through the pipe interior.

Figure 3:
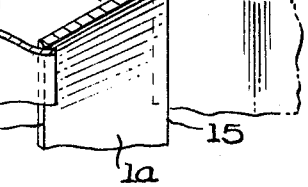
FIGURE 3 is a transverse sectional view showing a modification of the transition fitting of the present invention as applied to the joining of circumferentially corrugated pipe sections of unequal diameters.
Figure 2:
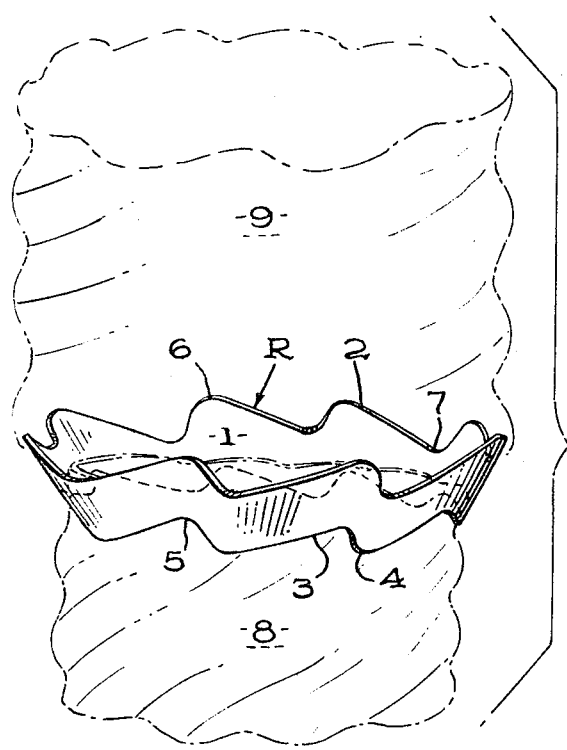
FIGURE 2 is the perspective view of the transition fitting of the present invention and shows in broken lines the joining of two helically corrugated pipe sections having unmodified, square cut ends.

In the embodiment illustrated in FIGURE 3, the ring R' comprises a smoothly tapered conical wall 1a similar to that in the ring R; however, in this embodiment the edges 14 and 15 of the ring R' are straight such that this transition fitting may be considered to be a frusto-conical member. By utilizing the transition fitting R' the corrugated pipe sections 16 and 17, which are of unequal diameter and include corrugations which are circumferentially rather than helically disposed, may be connected. In such an assembly it will be understood that there is no thread-like fit when applying the ring R' to either one of the pipe sections 16 or 17. The lesser diameter edge 14 of the ring is positioned exteriorly of the first corrugation valley of the pipe section 16 and the other edge 15 of the ring is disposed interiorly beneath the first crest formed in the larger diameter pipe section 17 whereafter some form of permanent anchoring such as welding will then be necessary to rigidize the transition fitting.

It will follow that a combination of the features of both of the rings R and R' may be utilized by providing a ring having one edge scalloped while the other edge is straight cut wherein it is desired to connect a helically corrugated pipe section to a circumferentially corrugated pipe section or to even a smooth pipe.

Thus, it will be seen that a transition fitting is provided that can be applied to any square cut end of corrugated pipe for which it was sized without the necessity of modifying the corrugated pipe section in any way, thus permitting the use of pipe sections which have been shop or field cut to a desired length from standard stock lengths without resulting in costly lay-down or the necessity of reworking the cut end as required when using less versatile transition fittings. The transition fitting may be used to join corrugated pipe made of various weldable and fusible materials such as steel, aluminum or plastics but is not necessarily limited thereto, or it may be used without welding or bonding to provide a thread-like connector means between same or dissimilar materials. The present device also makes possible the easy length adjustment of a pipe assembly by permitting the threading of a pipe of smaller diameter into a pipe of larger diameter due to the thread-like configuration provided by this transition fitting.

We claim:

1. A coupling including, two pipe sections of unequal diameters, a transition fitting comprising a circular ring having an inclined wall, one edge of said ring including a diameter less than the other edge of said ring and engaging the outer periphery of said pipe section of lesser diameter, the other and greater diameter edge of said ring engaging the inner periphery of said pipe section of larger diameter, at least one of said pipe sections provided with a helically corrugated wall presenting a plurality of crests and valleys when viewed along any single transverse plane through said pipe section, and said ring edge engaging said corrugated wall pipe section is scalloped to mate with each of said crests and valleys, whereby the extent of the contact surface between said scalloped edge and said corrugated pipe section is greater than the linear circumference of said corrugated pipe section.

2. A coupling according to claim 1, wherein both of said pipe sections include helically corrugated walls.

3. A coupling including, two pipe sections of unequal diameters, a transition fitting comprising a circular ring having an inclined wall, one edge of said ring including a diameter less than the other edge of said ring and engaging the outer periphery of said pipe section of lesser diameter, the other and greater diameter edge of said ring engaging the inner periphery of said pipe section of larger diameter, at least one of said pipe sections having a helically corrugated wall including a plurality of crests and valleys presenting an undulating curve when viewed along any single transverse plane through said pipe section, and said ring edge engaging said corrugated pipe section is provided with a plurality of peaks and indentations equal in number to and engaging, respectively, said valleys and crests to provide a substantially continuous contact surface between said ring and corrugated pipe.

References Cited

UNITED STATES PATENTS

| | | | |
|---|---|---|---|
| 1,722,676 | 7/1929 | Parker | 285—177 |
| 1,865,926 | 7/1932 | Laing | 285—177 X |
| 1,984,887 | 12/1934 | Mackert | 285—177 X |
| 2,095,702 | 10/1937 | Johnson | 285—177 X |
| 2,787,430 | 4/1957 | D'Auriac | 285—177 X |

THOMAS F. CALLAGHAN, *Primary Examiner.*

U.S. Cl. X.R.

285—390, 424